United States Patent
Kini et al.

(10) Patent No.: US 9,461,910 B2
(45) Date of Patent: Oct. 4, 2016

(54) METHOD AND APPARATUS FOR USING ENTROPY LABELS IN SEGMENT ROUTED NETWORKS

(71) Applicant: TELEFONAKTIEBOLAGET L M ERICSSON (PUBL), Stockholm (SE)

(72) Inventors: Sriganesh Kini, Fremont, CA (US); Shahryar Khan, Rönninge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 293 days.

(21) Appl. No.: 14/097,024

(22) Filed: Dec. 4, 2013

(65) Prior Publication Data

US 2015/0030020 A1   Jan. 29, 2015

Related U.S. Application Data

(60) Provisional application No. 61/859,567, filed on Jul. 29, 2013.

(51) Int. Cl.
*H04L 12/723* (2013.01)
*H04L 12/707* (2013.01)
*H04L 12/911* (2013.01)
*H04L 12/803* (2013.01)

(52) U.S. Cl.
CPC ............ *H04L 45/50* (2013.01); *H04L 45/24* (2013.01); *H04L 47/125* (2013.01); *H04L 47/726* (2013.01)

(58) Field of Classification Search
CPC ... H04L 47/125; H04L 47/726; H04L 45/24; H04L 45/50
See application file for complete search history.

(56) References Cited

U.S. PATENT DOCUMENTS

| | | | |
|---|---|---|---|
| 2004/0190517 A1* | 9/2004 | Gupta ................. | H04L 45/10 370/392 |
| 2007/0258447 A1* | 11/2007 | Raszuk ................ | H04L 12/66 370/389 |
| 2011/0164503 A1* | 7/2011 | Yong ................... | H04L 69/22 370/237 |
| 2012/0051259 A1* | 3/2012 | Gintis ................. | H04L 12/2697 370/253 |

OTHER PUBLICATIONS

R. Singh et al., "Entropy label for seamless MPLS draft-ravisingh-mpls-el-for-seamless-mpls-00", MPLS Working Group, Internet-Draft, Feb. 18, 2013, pp. 1-21, sections 1, 2, 3, 4.2, 4.3.1, 5.2.2.1, 5.3.1, 5.3.2.
Kompella K. et al., IETF RFC 6790, The Use of Entropy Labels in MPLS Forwarding, Nov. 2012, the whole document.
Rosen E., et al., IETF RFC 3031, Multiprotocol Label Switching Architecture, Jan. 2001, the whole document.

* cited by examiner

*Primary Examiner* — Anez Ebrahim

(57) ABSTRACT

A method and apparatus for using entropy labels in segment routed networks is disclosed. A single ELI and a single EL are provided for a label stack. The ELI and EL are inserted directly below a top-most label in the label stack.
A method and apparatus for using entropy labels in segment routed networks. A top-most label of a label stack of a packet is examined. A NHLFE for the packet is determined. A determination is made as to whether or not an ELI is below the top-most label. An EL is re-used when the ELI is determined to be present. The ELI and the re-used EL are inserted directly below a label associated with the NHLFE in a new label stack.

20 Claims, 9 Drawing Sheets

I - Ingress
E - Egress
P - transit node
S1, S2 - Service nodes

Segment-routed network example

I - Ingress
E - Egress
P - transit node
S1, S2 - Service nodes

Segment-routed network example

Process labeled packet packet.is_EL_present = FALSE

Figure 2

METHOD AND APPARATUS FOR USING ENTROPY LABELS IN SEGMENT ROUTED NETWORKS

CROSS-REFERENCE TO RELATED APPLICATION

This application claims priority to U.S. Provisional Application Ser. No. 61/859,567, filed on Jul. 29, 2013, the entire disclosure of which is hereby incorporated herein by reference in its entirety.

FIELD

The present disclosure relates to segment routing. More particularly, the present disclosure relates to using entropy labels for segment routing.

BACKGROUND

Segment routing (SR) leverages the source routing and tunneling paradigms to steer a packet through a set of segments. SR can be directly applied to the multi-protocol label switching (MPLS) data plane with no change to the forwarding plane. However, MPLS data planes have equal cost multi-path (ECMP) load balancing defined by Entropy labels. Applying Entropy labels, however, causes some issues.

FIG. 1 illustrates a segment-routed network example. The ingress label switched router (LSR) (I) wants to send traffic to egress LSR (E). In this example, the traffic is required to go through nodes S1 and S2. This requirement could be due to traffic engineering or to apply services at those nodes. This traffic should get the benefits of ECMP as it transits the network from I to S1, S1 to S2 and S2 to E. P is representative of an LSR in the transit network. In this example, L-S1, L-S2 and L-E denote the node Segment Identifiers (node-SID) of LSRs 51, S2 and E respectively. To benefit from ECMP, entropy labels should be used. Two possible ways to use the entropy labels and their associated problems are discussed below.

In this option a single entropy label is used for all segments. The ingress LSR encodes the entropy label (EL) below all the SIDs. Thus the label stack would look like <L-S1, L-S2, L-E, ELI, EL> <remaining packet header>. RFC 6790 describes a label stack. RFC 6790 requires that the label immediately preceding an EL in the MPLS label stack be an Entropy Label Identifier (ELI). A primary disadvantage of this approach is that as the label stack grows due to an increase in the number of SIDs, the EL goes deeper in the label stack. As a result, intermediate LSRs (such as P) have to walk the label stack at least until the EL to perform correct multipath load balancing decisions and have to access a larger number of bytes in the packet header. As an example if the packet is required to go through 10 specific LSRs, then the label stack is 12 (10 SIDs+ELI+EL) labels deep and the intermediate LSR has to access 48 bytes of memory to process each packet. However intermediate LSRs are built for high speed e.g. 100G/400G/1T line rates and it becomes significantly expensive to access memory at those processing speeds.

In the second option, an EL is used per segment. The ingress LSR pushes an <ELI, EL> before pushing a SID when ECMP is required to reach the LSR of that SID. In this example, for FIG. 1, the ingress LSR encoded label stack would look like <L-S1, ELI, EL1, L-S2, ELI, EL2, L-E, ELI, EL3> where all the ELs would typically have the same value. A primary disadvantage of this approach is that the size of the label stack grows significantly, almost 3 times as the number of SIDs in the label stack. In the same example as above if the packet is required to go through 10 specific LSRs, then the label stack is 30 (10 SIDs, 10 ELIs, 10 ELs) labels deep, i.e, 120 bytes of just packet header. This overhead is quite high where bandwidth is scarce and especially where actual user-payload is small. In a network such as the Radio Access Network (RAN) or Mobile Backhaul Network (MBH) these are typical characteristics and can lead to significant inefficiency.

Therefore, there is a need in the art to solve the above described problems in order to reduce the inefficiencies present in using entropy labels for segment routing.

SUMMARY

A method and apparatus for using entropy labels in segment routed networks is disclosed. The apparatus can be a network node, e.g., a LSR, that processes label stacks having one or more segments. In one embodiment, a single ELI and a single EL are provided for a label stack. The ELI and EL are inserted directly below a top-most label in the label stack.

In one embodiment, when the ELI is determined to be below a top-most label in the label stack the LSR pops the ELI, sets a presence of the EL to true, and pops the EL.

In one embodiment, the LSR determines whether a new label is at a bottom of the label stack. The LSR determines whether a presence of the EL is set to true. The LSR then determines whether a top-of-stack label is equal to the ELI.

In one embodiment, the new label is not at the bottom of the label stack, the presence of the EL is set to true, and the top-of-stack label is equal to ELI. In this embodiment, the LSR: pushes the EL, pushes the ELI, and encodes the new label.

In one embodiment, the LSR determines that a presence of the EL is set to true. In this embodiment, the LSR: sets the EL to a bottom of the label stack, pushes the EL, sets the bottom of the label stack to zero, pushes the ELI, and encodes the new label.

In one embodiment, the LSR determines whether a presence of the EL is set to true. The LSR also determines whether a top of stack label is equal to the ELI.

In one embodiment, the presence of the EL is set to true and the top-of-stack label is not equal to the ELI. In this embodiment, the LSR: sets the EL to a bottom of the label stack, pushes the EL, sets the bottom of the stack to zero, pushes the ELI, and encodes the new label.

A method and apparatus for using entropy labels in segment routed networks. The apparatus can be a network node, e.g., a LSR, that processes label stacks having one or more segments. In one embodiment, a top-most label of a label stack of a packet is examined. A NHLFE for the packet is determined. A determination is made as to whether or not an ELI is below the top-most label. An EL is re-used when the ELI is determined to be present. The ELI and the re-used EL are inserted directly below a label associated with the NHLFE in a new label stack.

In one embodiment, the LSR inserts the ELI and the re-used EL directly below a label associated with the NHLFE in a new label stack.

In one embodiment, the ELI is determined by the LSR to be below the top-most label. In this embodiment, the LSR: pops the ELI, sets a presence of the EL to true, and pops the EL.

In one embodiment, re-using the entropy label includes the LSR determining whether a new label is at a bottom of the label stack. The LSR determines whether a presence of the EL is set to true. The LSR also determines whether a top-of-stack label is equal to the ELI.

In one embodiment, the new label is not at the bottom of the label stack, the presence of the EL is set to true, and the top-of-stack label is equal to ELI. In this embodiment, the LSR: pushes the EL, pushes the ELI, and encodes the new label.

In one embodiment, re-using the entropy label includes determining that a presence of the EL is set to true. In this embodiment, the LSR: sets the EL to a bottom of the stack, pushes the EL, sets the bottom of the stack to zero, pushes the ELI, and encodes the new label.

In one embodiment, re-using the entropy label includes the LSR determining whether a presence of the EL is set to true. The LSR also determines whether a top of stack label is equal to the ELI.

In one embodiment, the LSR sets a presence of the EL is to true and determines that the top-of-stack label is not equal to the ELI. In this embodiment, the LSR: sets the EL to a bottom of the stack, pushes the EL, sets the bottom of the stack to zero, pushes the ELI, and encodes the new label.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to affect such feature, structure, or characteristic in connection with other embodiments whether or not explicitly described.

FIG. 2 is an illustration of a block diagram of an initialization procedure method according to one embodiment.

DESCRIPTION OF EMBODIMENTS

Figure 1:
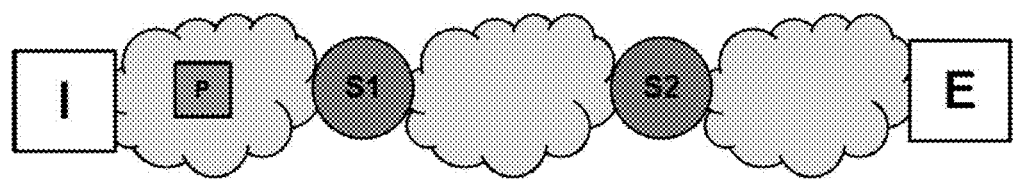
FIG. 1 is an illustration of an example segment-routed network.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

As used herein, a network element (e.g., a router, switch, bridge) is a piece of networking equipment, including hardware and software that communicatively interconnects other equipment on the network (e.g., other network elements, end stations). Some network elements are "multiple services network elements" that provide support for multiple networking functions (e.g., routing, bridging, switching, Layer 2 aggregation, session border control, Quality of Service, and/or subscriber management), and/or provide support for multiple application services (e.g., data, voice, and video). Subscriber end stations (e.g., servers, workstations, laptops, netbooks, palm tops, mobile phones, smartphones, multimedia phones, Voice Over Internet Protocol (VOIP) phones, user equipment, terminals, portable media players, tablets, GPS units, gaming systems, set-top boxes) access content/services provided over the Internet and/or content/services provided on virtual private networks (VPNs) overlaid on (e.g., tunneled through) the Internet. The content and/or services are typically provided by one or more end stations (e.g., server end stations) belonging to a service or content provider or end stations participating in a peer to peer service, and may include, for example, public webpages (e.g., free content, store fronts, search services), private webpages (e.g., username/password accessed webpages providing email services), and/or corporate networks over VPNs. Typically, subscriber end stations are coupled (e.g., through customer premise equipment coupled to an access network (wired or wirelessly)) to edge network elements, which are coupled (e.g., through one or more core network elements) to other edge network elements, which are coupled to other end stations (e.g., server end stations).

Different embodiments of the invention may be implemented using different combinations of software, firmware, and/or hardware. Thus, the techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device.

The present disclosure provides a solution to the inefficiencies of prior art methods for implementing entropy labels for segment routing. For the purposes of this disclosure, the terms "segment" and "tunnel" can be used interchangeably. The solution solves the aforementioned problems by introducing the concept of re-usable EL. Re-usable EL defines new label stack processing procedures that are consistent with RFC 3031. With re-usable EL, the label stack always has a single EL even though there may be multiple segments. Additionally, the <ELI, EL> is present below the topmost label of the label stack of a packet even as it transits multiple segments on the way to the egress. The forwarding path on the application specific integrated circuit (ASIC) or network processing unit (NPU) stores additional metadata with each packet as the packet is being processed on the LSR. The metadata can be a boolean (packet.is_EL_present) and a 4 byte value of the EL (packet.EL). When a packet is received by the LSR, packet.is_EL_present is initialized to false as shown in FIG. 2.

Figure 3:
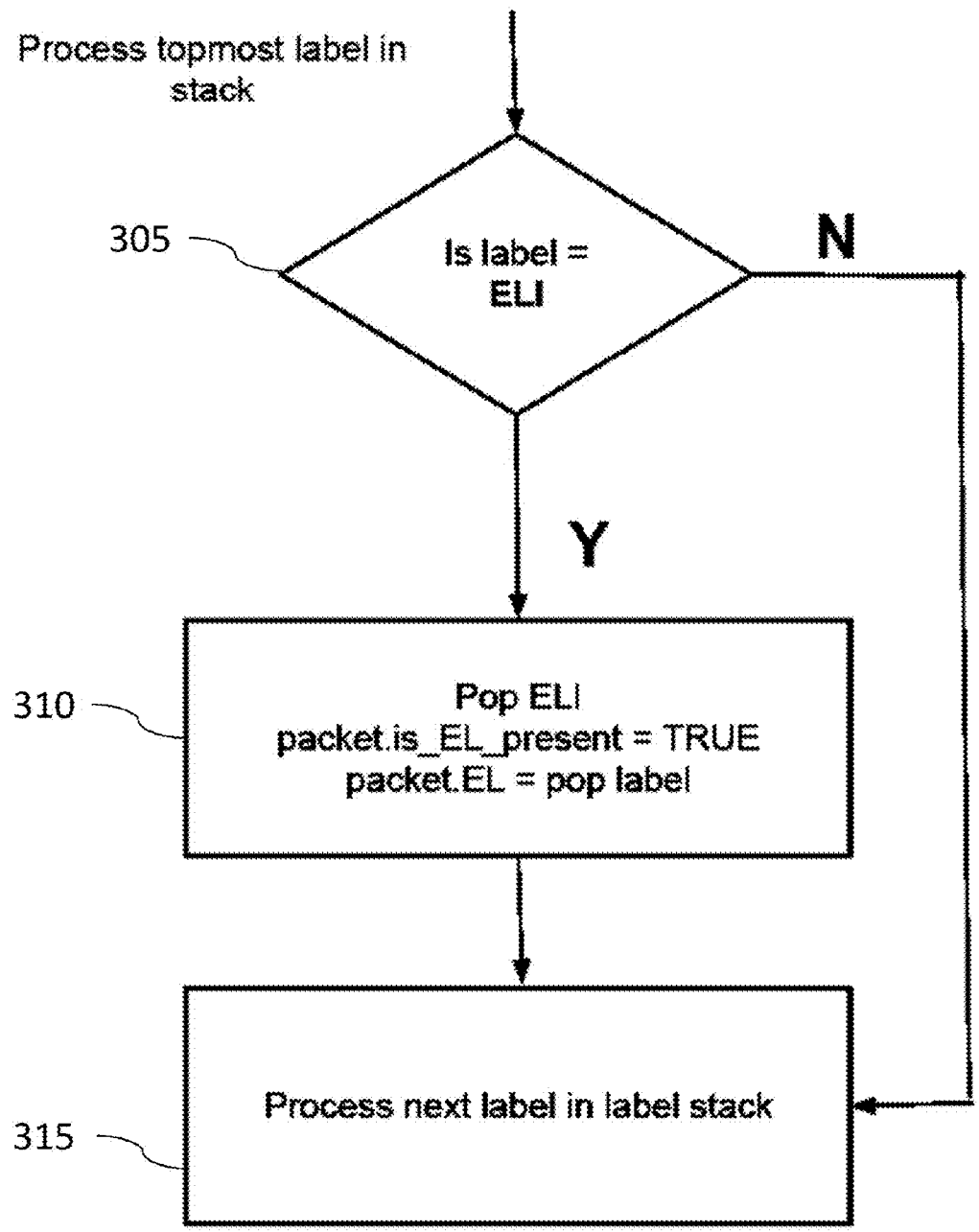
FIG. 3 illustrates a block diagram of a method for ELI processing according to one embodiment.

FIG. 3 illustrates a block diagram of a method for ELI processing. A top-most label in the stack is processed. The ELI and EL are located under the top-most label. At block 305, a determination is made as to whether the next label is an ELI. When the label is not an ELI, the next label in the stack is processed at block 315. When the next label is an ELI, at block 310, the LSR pops the ELI from the packet, sets packet.is_EL_present to true and pops the next label, i.e., the EL, and sets it to packet.EL. The next label in the stack is then processed at block 315. This operation is different from the processing specified in section 4.1 of RFC 6790, where the ELI and EL are not stored after the pop operation. However, the method of FIG. 3 does not violate any of the processing rules in RFC 6790.

Figure 4:
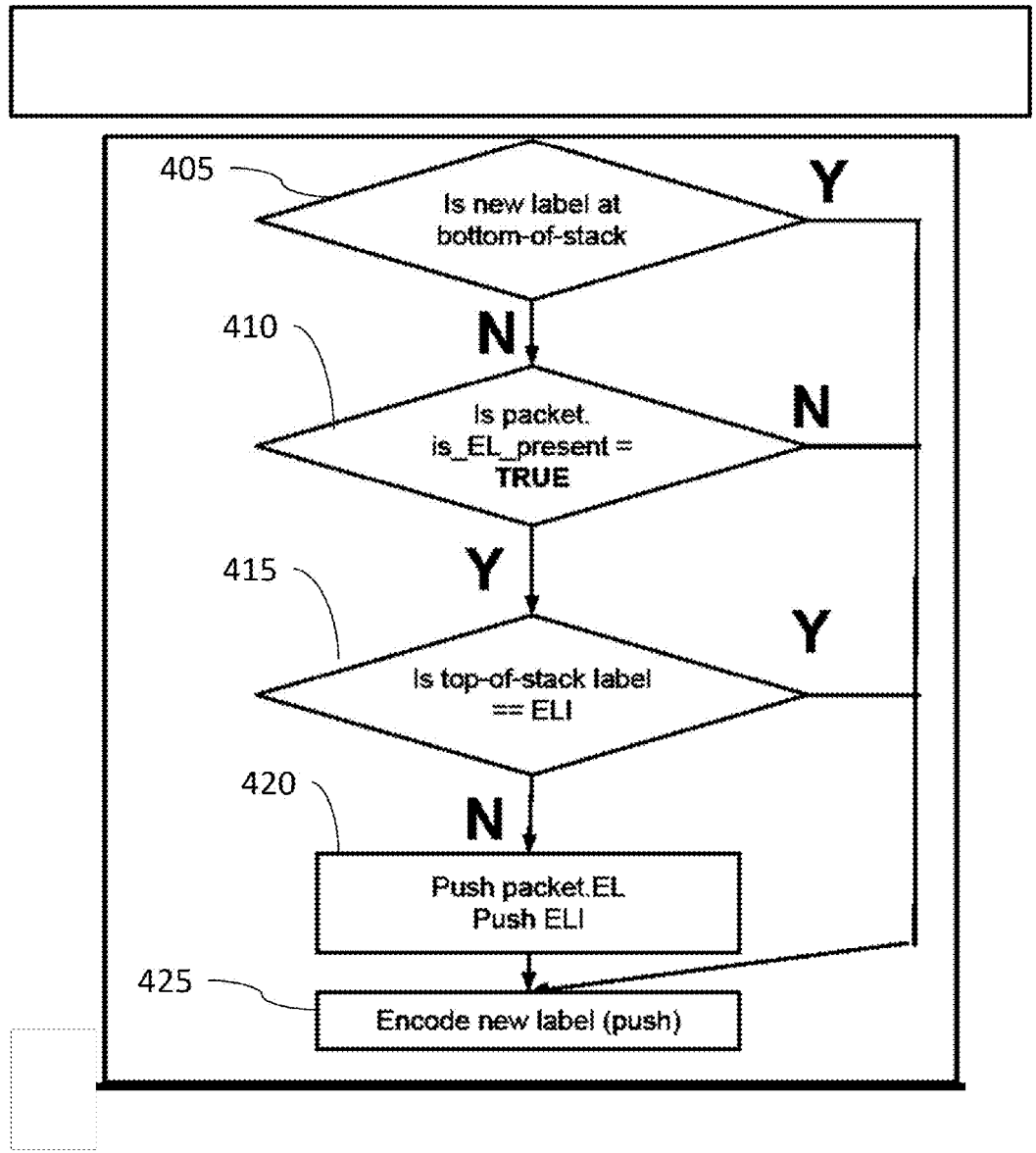
FIG. 4 illustrates a block diagram of a method for performing a swap operation of a labeled packet according to one embodiment.

FIG. 4 illustrates a block diagram of a method for performing a swap operation of a labeled packet. At block 405, a determination is made as to whether a new label is at the bottom of the label stack. If the label is at the bottom of the stack, the label is encoded into the packet, i.e., the new label is pushed at block 425. If the new label is not at the bottom of the stack, the method proceeds to block 410. At block 410, a check is made as to whether an EL is present. When the EL has not been determined to be present, the new label is encoded at block 425. When the EL has been determined to be present, e.g., packet.is_EL_present=TRUE, a determination is made at block 415 as to whether the top of stack label is an ELI. If the top of stack label is the ELI label, the new label is encoded into the packet at block 425. If the top of stack label is not the ELI label, the EL and ELI are pushed, e.g., encoded onto the label stack at block 420. The method then proceeds to block 425, where the new label is encoded into the packet.

In other words, when the LSR performs a swap operation of a labeled packet as specified in section 3.13 of RFC 3031, the outgoing label and Next Hop Label Forwarding Entry (NHLFE) are selected. Before encoding the new label onto the packet, a check is first made as to whether there is an ELI below that label in the packet. The packet is checked to determine the presence of an entropy label. If an entropy label is present, packet.EL is re-used and the labels <ELI, packet.EL> are encoded on the packet first and then the new label in the label stack is encoded into the packet as described in section 3.13 of RFC 3031. It is very important to note that these procedures have been designed such that no extra memory accesses, i.e., reads or writes are required. Only the memory that is already in cache when the packet header is read is sufficient to execute this procedure.

Figure 5:
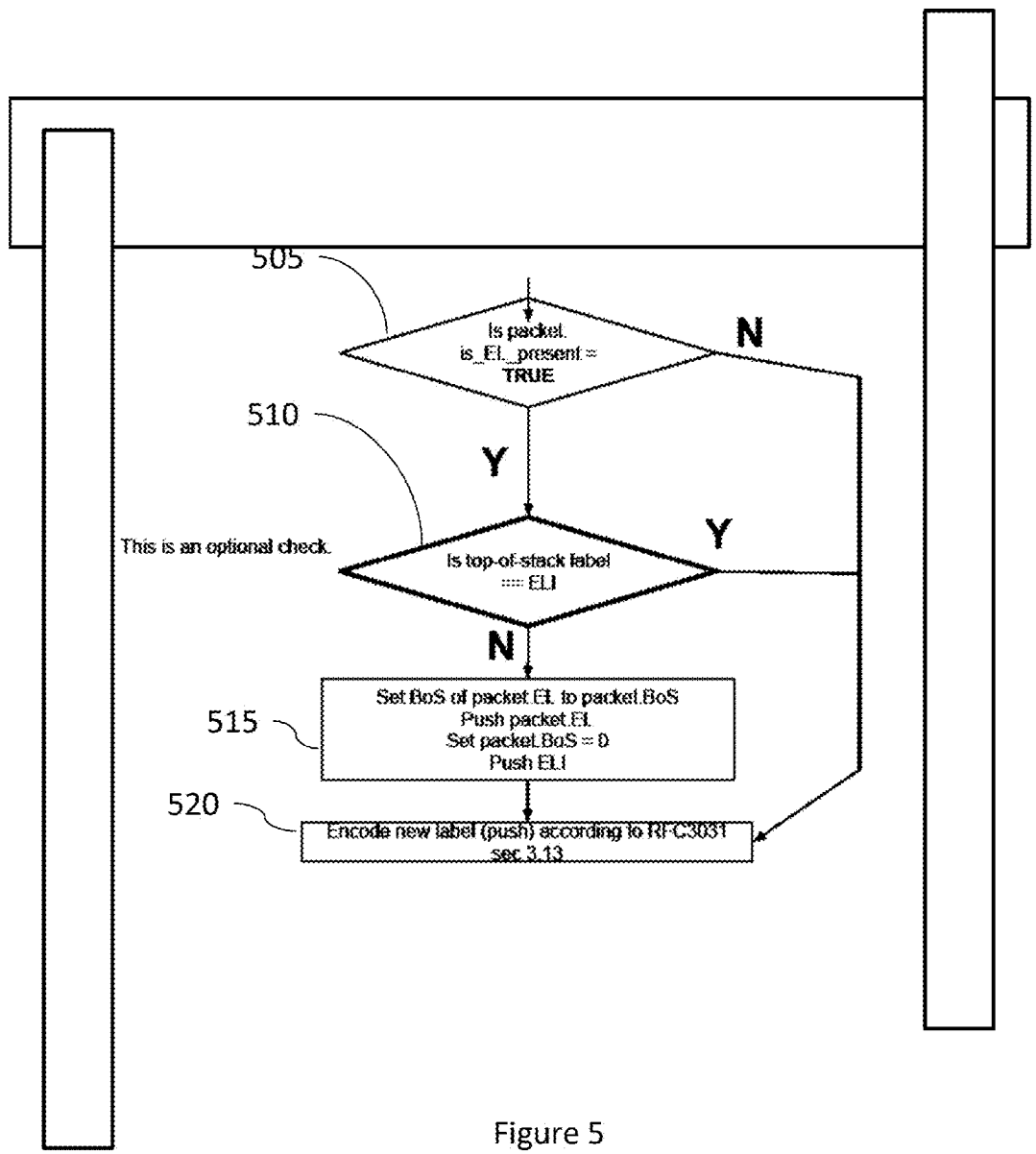
FIG. 5 illustrates a block diagram of a method for performing a swap operation of a labeled packet according to one embodiment.

FIG. 5 illustrates a block diagram of a method for performing a swap operation of a labeled packet. In this method, packet.BOS is the bottom-of-stack of the label that is being swapped. At block 505, the packet is checked to determine the presence of an entropy label. When the EL has not been determined to be present, the new label is encoded into the packet, i.e., the new label is pushed at block 520 (in accordance with RFC 3031, section 3.13). When the EL has been determined to be present, e.g., packet.is_EL_present=TRUE, the method either proceeds to block 510 or directly to block 515 because the check performed at block 510 is optional.

At block 510, a determination is made as to whether the top of stack label is an ELI. When the top-of-stack label is an ELI, the new label is encoded into the packet (in accordance with RFC 3031, section 3.13). When the top-of-stack label is not an ELI, the method proceeds to block 515.

At block 515, the bottom-of-stack (BoS) of packet.El is set to packet.BoS, packet.EL is pushed, packet.BoS is set to equal zero (packet.BoS=0), and the ELI is pushed. At block 520, the new label is encoded (pushed) (in accordance with RFC 3031, section 3.13).

Returning to FIG. 1, it can now be described how these modified procedures are used to process the label stack. The ingress pushes the <ELI, EL> below the topmost SID. Thus, the label stack when the ingress forwards the packet is <L-S1, ELI, EL, L-S2, L-E>. When S1 forwards the packet the label stack becomes <L-52, ELI, EL, L-E>. When S2 forwards the packet the label stack becomes <L-E, ELI, EL>.

Figure 6:
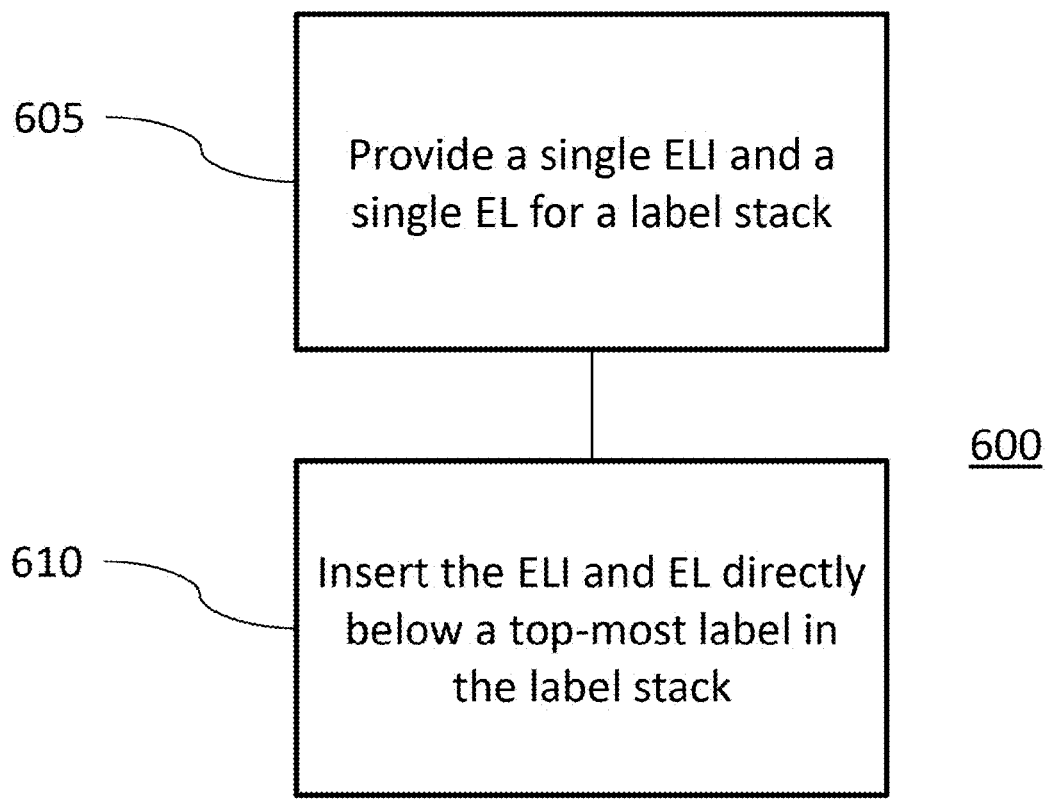
FIG. 6 illustrates a method 600 for using entropy labels in segment routed networks.

FIG. 6 illustrates a method 600 for using entropy labels in segment routed networks. Method 600 can be implemented in a network node, e.g., a LSR, that processes label stacks having one or more segments. At block 605, a single ELI and a single EL are provided for a label stack. At block 610, the ELI and EL are inserted directly below a top-most label in the label stack.

In one embodiment, when the ELI is determined to be below a top-most label in the label stack the LSR pops the ELI, sets a presence of the EL to true, and pops the EL.

In one embodiment, the LSR determines whether a new label is at a bottom of the label stack. The LSR determines whether a presence of the EL is set to true. The LSR then determines whether a top-of-stack label is equal to the ELI.

In one embodiment, the new label is not at the bottom of the label stack, the presence of the EL is set to true, and the top-of-stack label is equal to ELI. In this embodiment, the LSR: pushes the EL, pushes the ELI, and encodes the new label.

In one embodiment, the LSR determines that a presence of the EL is set to true. In this embodiment, the LSR: sets the EL to a bottom of the label stack, pushes the EL, sets the bottom of the label stack to zero, pushes the ELI, and encodes the new label.

In one embodiment, the LSR determines whether a presence of the EL is set to true. The LSR also determines whether a top of stack label is equal to the ELI.

In one embodiment, the presence of the EL is set to true and the top-of-stack label is not equal to the ELI. In this embodiment, the LSR: sets the EL to a bottom of the label stack, pushes the EL, sets the bottom of the stack to zero, pushes the ELI, and encodes the new label.

Figure 7:
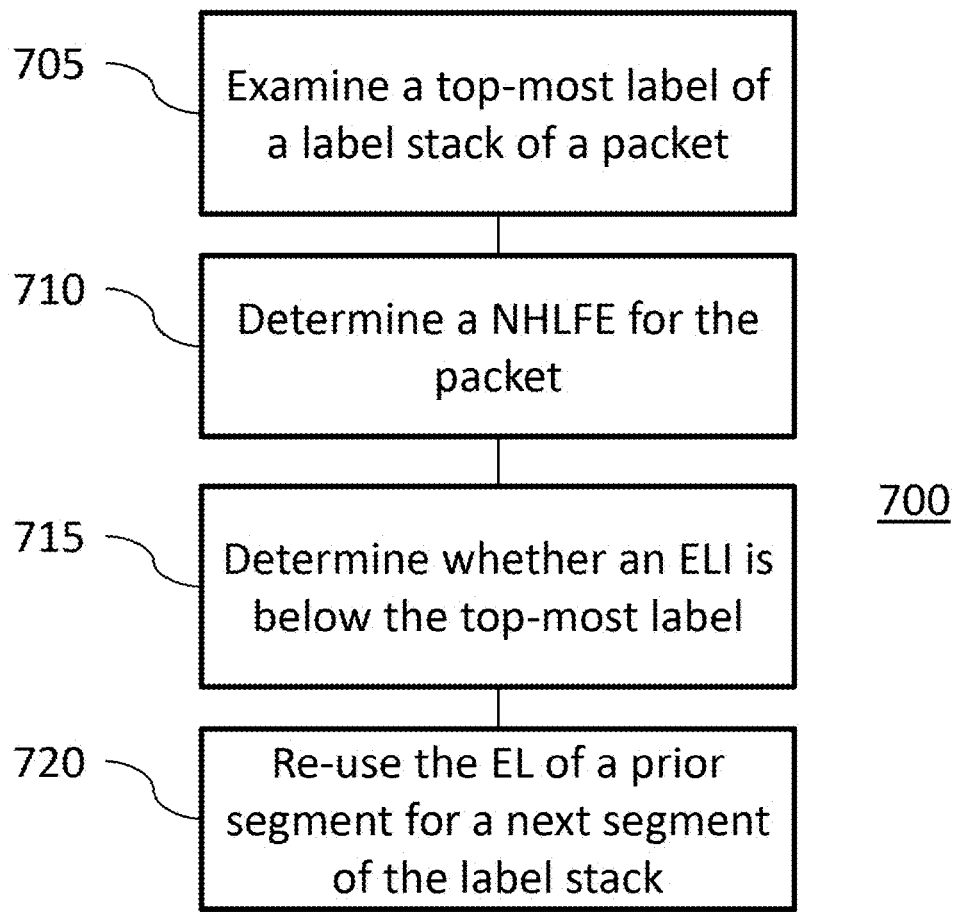
FIG. 7 illustrates a method 700 for using entropy labels in segment routed networks.

FIG. 7 illustrates a method 700 for using entropy labels in segment routed networks. Method 700 can be implemented in a network node, e.g., a LSR, that processes label stacks having one or more segments. At block 705, a top-most label of a label stack of a packet is examined. At block 710, a NHLFE for the packet is determined. At block 715, a determination is made as to whether or not an ELI is below the top-most label. At block 720, an EL is re-used when the ELI is determined to be present. At block 725, the ELI and the re-used EL are inserted directly below a label associated with the NHLFE in a new label stack.

In one embodiment, the LSR inserts the ELI and the re-used EL directly below a label associated with the NHLFE in a new label stack.

In one embodiment, the ELI is determined by the LSR to be below the top-most label. In this embodiment, the LSR: pops the ELI, sets a presence of the EL to true, and pops the EL.

In one embodiment, re-using the entropy label includes the LSR determining whether a new label is at a bottom of the label stack. The LSR determines whether a presence of the EL is set to true. The LSR also determines whether a top-of-stack label is equal to the ELI.

In one embodiment, the new label is not at the bottom of the label stack, the presence of the EL is set to true, and the top-of-stack label is equal to ELI. In this embodiment, the LSR: pushes the EL, pushes the ELI, and encodes the new label.

In one embodiment, re-using the entropy label includes determining that a presence of the EL is set to true. In this embodiment, the LSR: sets the EL to a bottom of the stack, pushes the EL, sets the bottom of the stack to zero, pushes the ELI, and encodes the new label.

In one embodiment, re-using the entropy label includes the LSR determining whether a presence of the EL is set to true. The LSR also determines whether a top of stack label is equal to the ELI.

In one embodiment, the LSR sets a presence of the EL is to true and determines that the top-of-stack label is not equal to the ELI. In this embodiment, the LSR: sets the EL to a bottom of the stack, pushes the EL, sets the bottom of the stack to zero, pushes the ELI, and encodes the new label.

Figure 8:
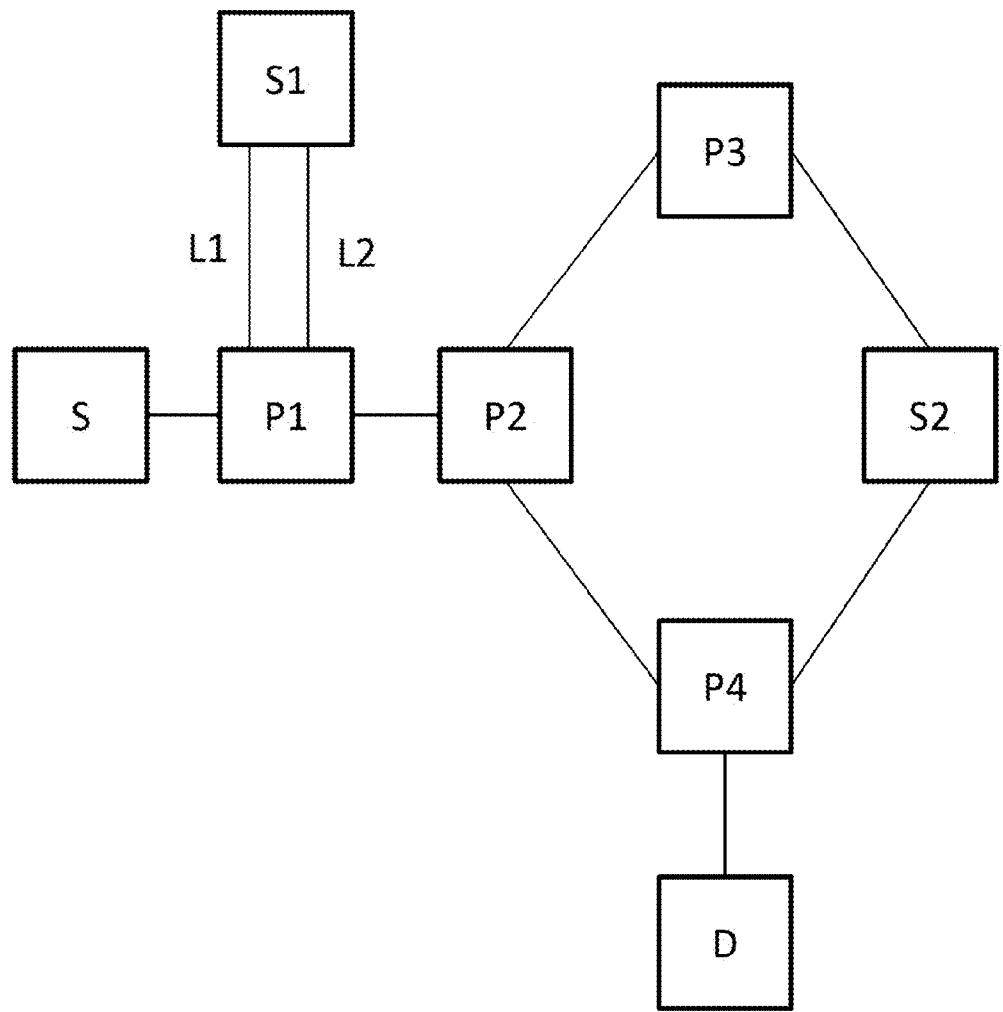
FIG. 8 illustrates a service chaining network, according to one embodiment.

FIG. 8 illustrates a service chaining network, according to one embodiment. In this example service chaining network: S is a source LSR; D is a destination LSR; S1 and S2 are service nodes; L1 and L2 are links; and P1, P2, P3, and P4 are transit LSRs. The source LSR S wants to send traffic to destination LSR D. This traffic is required to go through service nodes S1 and S2 to produce the service chain S-S1-S2-D. Segment Routing can be used to achieve this. In this embodiment, load balancing is required across the parallel links between P1 and S1. Load balancing is also required between the ECMP paths from S1 to S2, S1-P1-P2-P3-S2 and S1-P1-P2-P4-S2. The source LSR wants the intermediate LSRs P1 and P2 to take local load balancing decisions and does not specify the Segment Identifiers (SIDs) of specific interfaces. Entropy labels can be used to achieve the desired load balancing. SN is denoted to be the node segment identifier (SID) of LSR N and SN {L1,L2, ... } to denote the SID of the adjacency set for links {L1 ,L2, ... } of LSR N and S-N to denote the SID for a service at service node N. The label stack that the source LSR S uses for the service chain can be <SS1, S-S1, SS2, S-S2, SD> or <SP1, SP1{L1,L2}, S-S1, SS2, S-S2, SD>.

In this option a LSR that terminates a tunnel re-uses the EL of the terminated tunnel for the next inner tunnel. It does this by storing the EL from the outer tunnel when that tunnel is terminated and re-inserting it below the next inner tunnel label during the label swap operation. The LSR that stacks tunnels SHOULD insert an EL below the outermost tunnel. ELs are not inserted for any inner tunnels.

With respect to FIG. 8, the source LSR S encoded label stack would be <SP1, ELI, EL, SP1{L1,L2}, SS1, S-S1, SS2, SD>. At P1 the outgoing label stack would be <SS1, ELI, EL, S-S1, SS2, SD> after it has load balanced to one of the links L1 or L2. At S1 the outgoing label stack would be <SS2, ELI, EL, SD>. At P2 the outgoing label stack would be <SS2, ELI, EL, SD> and it would load balance to one of the next hop LSRs P3 or P4. Accessing the EL at an intermediate LSR is independent of the depth of the label stack and hence independent of the specific use-case to which the stacked tunnels are applied.

The procedures described in FIGS. 3-8 do not process the entire label stack because as an action of processing a label, the packet may be forwarded. In this case, the rest of the label stack will be processed at subsequent LSRs.

Figure 9:
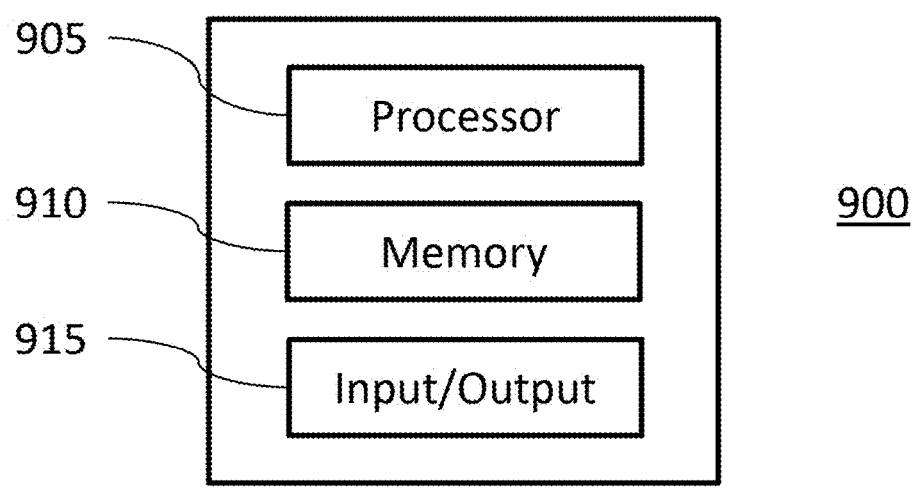
FIG. 9 is an illustration of an example network element or node according to one embodiment.

FIG. 9 is an illustration of an example network element or node according to one embodiment. Network element 900 comprises a processor (CPU) 905, a memory 910, e.g., random access memory (RAM) and/or read only memory (ROM), and various input/output devices 915, (e.g., storage devices, including but not limited to, a tape drive, a floppy drive, a hard disk drive or a compact disk drive, a receiver, a transmitter). Network element 900 is capable of implementing methods for using entropy labels for segment routing. In particular, in one embodiment, network element 900 can be used to implement a LSR.

The processes described above, including but not limited to those presented in connection with FIGS. 1-8, may be implemented in general, multi-purpose or single purpose processors. Such a processor, e.g., processor 905, will execute instructions, either at the assembly, compiled or machine-level, to perform that process. Those instructions can be written by one of ordinary skill in the art following the description of presented above and stored or transmitted on a computer readable medium, e.g., a non-transitory computer-readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

While the invention has been described in terms of several embodiments, those skilled in the art will recognize that the invention is not limited to the embodiments described. The description is thus to be regarded as illustrative instead of limiting.

What is claimed is:

1. A method for routing information using entropy labels in a segment routed network having label switched routers (LSRs) that process label stacks corresponding to one or more segments of the segmented routed network from an ingress LSR to an egress LSR, which comprises:
   providing a single entropy label identifier (ELI) and a single entropy label (EL) for a label stack associated with a packet traversing from the ingress LSR to the egress LSR;
   inserting the ELI and EL directly below a top-most label in the label stack; and
   re-using the ELI and EL as the packet traverses from the ingress LSR to the egress LSR, wherein the ELI and EL are processed in one or more swap operations to occupy a position directly below a current top-most label as the packet transits multiple segments to the egress LSR, thereby resulting in reduced overhead processing by an LSR.

2. The method of claim 1, wherein when the ELI is determined to be directly below a top-most label in the label stack:
   the LSR pops the ELI;
   the LSR sets a presence of the EL to true; and
   the LSR pops the EL.

3. The method of claim 1, wherein a swap operation further comprises:
   determining whether a new label is at a bottom of the label stack;
   determining whether a presence of the EL is set to true; and
   determining whether a top-of-stack label is equal to the ELI.

4. The method of claim 3, wherein the new label is not at the bottom of the label stack, the presence of the EL is set to true, and the top-of-stack label is equal to ELI.

5. The method of claim 4, wherein the LSR:
   pushes the EL;
   pushes the ELI; and
   encodes the new label.

6. The method of clam 1, which further comprises determining that a presence of the EL is set to true.

7. The method of claim 6, wherein the LSR:
   sets the EL to a bottom of the label stack;
   pushes the EL;
   sets the bottom of the label stack to zero;
   pushes the ELI; and
   encodes the new label.

8. The method of clam 1, which further comprises:
   determining whether a presence of the EL is set to true; and
   determining whether a top of stack label is equal to the ELI.

9. The method of claim 8, wherein the presence of the EL is set to true and the top-of-stack label is not equal to the ELI.

10. The method of claim 9, wherein the LSR:
    sets the EL to a bottom of the label stack;
    pushes the EL;
    sets the bottom of the stack to zero;
    pushes the ELI; and
    encodes the new label.

11. An apparatus for routing information using entropy labels in a segment routed network having label switched routers (LSRs) that process label stacks corresponding to one or more segments of the segmented routed network from an ingress LSR to an egress LSR, the LSRs each having a processor configured to:
    provide a single entropy label identifier (ELI) and a single entropy label (EL) for a label stack associated with a packet traversing from the ingress LSR to the egress LSR;
    insert the ELI and EL directly below a top-most label in the label stack; and
    re-use the ELI and EL as the packet traverses from the ingress LSR to the egress LSR, wherein the ELI and EL are processed in one or more swap operations to occupy a position directly below a current top-most label as the transits multiple segments to the egress LSR, thereby resulting in reduced overhead processing by an LSR.

12. The apparatus of claim 11, wherein the processor is further configured to perform, when ELI is determined to be directly below a top-most label in the label stack:
    pop the ELI;
    set a presence of the EL to true; and
    pop the EL.

13. The apparatus of claim 11, wherein the processor is further configured to perform in a swap operation:
    determine whether a new label is at a bottom of the label stack;
    determine whether a presence of the EL is set to true; and
    determine whether a top-of-stack label is equal to the ELI.

14. The apparatus of claim 13, wherein the processor is further configured to:
    determine that new label is not at the bottom of the label stack;
    determine that the presence of the EL is set to true; and
    determine that the top-of-stack label is equal to ELI.

15. The apparatus of claim 14, wherein the processor is further configured to
    push the EL;
    push the ELI; and
    encode the new label.

16. The apparatus of claim 11, wherein the processor is further configured to determine that a presence of the EL is set to true.

17. The apparatus of claim 16, wherein the processor is further configured to:
    set the EL to a bottom of the label stack;
    push the EL;
    set the bottom of the label stack to zero;
    push the ELI; and
    encode the new label.

18. The apparatus of clam 11, wherein the processor is further configured to:
    determine whether a presence of the EL is set to true; and
    determine whether a top of stack label is equal to the ELI.

19. The apparatus of claim 18, wherein the processor is further configured to determine that the presence of the EL is set to true and the top-of-stack label is not equal to the ELI.

20. The apparatus of claim 19, wherein the processor is further configured to:
    set the EL to a bottom of the label stack;
    push the EL;
    set the bottom of the stack to zero;
    push the ELI; and
    encode the new label.

* * * * *

UNITED STATES PATENT AND TRADEMARK OFFICE
CERTIFICATE OF CORRECTION

PATENT NO. : 9,461,910 B2  
APPLICATION NO. : 14/097024  
DATED : October 4, 2016  
INVENTOR(S) : Kini et al.

Page 1 of 1

It is certified that error appears in the above-identified patent and that said Letters Patent is hereby corrected as shown below:

In the Specification

Column 1, Line 38, delete "51," and insert -- S1, --, therefor.

Column 6, Line 49, delete "<L-52," and insert -- <L-S2, --, therefor.

In the Claims

Column 9, Line 44, Claim 6, delete "clam 1," and insert -- claim 1, --, therefor.

Column 9, Line 52, Claim 8, delete "clam 1," and insert -- claim 1, --, therefor.

Column 10, Line 52, Claim 18, delete "clam 11," and insert -- claim 11, --, therefor.

Signed and Sealed this  
Thirty-first Day of January, 2017

Michelle K. Lee  
*Director of the United States Patent and Trademark Office*